(12) United States Patent
Kadous

(10) Patent No.: US 8,700,054 B2
(45) Date of Patent: Apr. 15, 2014

(54) PREDICTION OF INDOOR LEVEL AND LOCATION USING A THREE STAGE PROCESS

(75) Inventor: Mohammed Waleed Kadous, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 184 days.

(21) Appl. No.: 13/157,802

(22) Filed: Jun. 10, 2011

(65) Prior Publication Data

US 2012/0315918 A1    Dec. 13, 2012

(51) Int. Cl.
*H04W 24/00*    (2009.01)

(52) U.S. Cl.
USPC ..................................... 455/456.1; 455/457

(58) Field of Classification Search
USPC .............. 455/456.1–457; 701/400–541; 340/988–996; 342/450–465
See application file for complete search history.

(56) References Cited

U.S. PATENT DOCUMENTS

| 7,916,690 | B2 | 3/2011 | Doshi et al. | |
| 2003/0144793 | A1* | 7/2003 | Melaku et al. | 701/209 |
| 2004/0258013 | A1 | 12/2004 | Belcea | |
| 2005/0130668 | A1* | 6/2005 | Cameron | 455/456.1 |
| 2005/0176406 | A1 | 8/2005 | Krishnakumar et al. | |
| 2007/0293240 | A1* | 12/2007 | Drennan | 455/456.1 |
| 2008/0032705 | A1 | 2/2008 | Patel et al. | |
| 2011/0028161 | A1* | 2/2011 | Larsen | 455/456.1 |
| 2011/0045846 | A1* | 2/2011 | Rekimoto | 455/456.1 |
| 2011/0084832 | A1 | 4/2011 | Midtun et al. | |
| 2011/0086646 | A1 | 4/2011 | Gupta et al. | |
| 2012/0029817 | A1* | 2/2012 | Khorashadi et al. | 701/451 |

FOREIGN PATENT DOCUMENTS

| KR | 2005-0086998 A | 8/2005 |
| WO | 2011031426 A1 | 3/2011 |

OTHER PUBLICATIONS

Leppakoski et al., "Comparsison of Indoor Positioning Algorithms Using WLAN Fingerprints", 11 pages (2010).
Navarro et al., "Wi-Fi Localization Using RSSI Fingerprinting", 6 pages (2010).
International Search Report dated Oct. 12, 2012, in International Application No. PCT/US2012/040853.

* cited by examiner

*Primary Examiner* — Lester Kincaid
*Assistant Examiner* — Daniel Lai
(74) *Attorney, Agent, or Firm* — Lerner, David, Littenberg, Krumholz & Mentlik, LLP

(57) ABSTRACT

A mobile computing device may be localized in an indoor area based on the strength of wireless network signals accessible in the indoor area from different access points. For efficiency, the localization may be performed in stages. In a first stage, a general geographic area, such as an "island" as will be described below, in which the mobile device is located is identified. In a second stage, an altitude or building level of the mobile device is identified. In a third stage, a position of the mobile device on the identified building level is determined. At least some of these stages of localization may utilize information received at the mobile device from surrounding access points. For example, the island on which the user is located may be determined by identifying at least one access point on that island. Further, decision trees may be executed using input related to a received signal strength from the surrounding access points, and outputs of the decision trees may indicate the device's location.

22 Claims, 15 Drawing Sheets

PREDICTION OF INDOOR LEVEL AND LOCATION USING A THREE STAGE PROCESS

BACKGROUND

Localization refers to the determination of a location of an object in three-dimensional space. Global Positioning System (GPS) technology is commonly used for localization in an outdoor environment. However, GPS is not as useful for indoor localization because signals from GPS satellites are generally not powerful enough to penetrate most buildings or other structures that create indoor environments.

A more useful tool for indoor localization involves wireless network. For example, wireless network fingerprinting creates a radio map of a given area based on received signal strength indication (RSSI) data from several access points and generates a probability distribution of RSSI values for a given latitude and longitude. Live RSSI values may then be compared to the fingerprint to find the closest match and generate a predicted location. Methods for predicting the location include Hidden Markov, Nearest Neighbor, and triangulation.

BRIEF SUMMARY

One aspect of the technology provides a method, comprising defining one or more islands, maintaining identifiers of the access points associated with each island, building for each island, using a processor, a first classifier, the first classifier indicating a level of the indoor area, and building for each level, using the processor, a second classifier, the second classifier indicating a position on the level. Each island may be a subdivision of a geographical region and may include one or more access points, where any access point in an island is likely not visible outside that island. The islands may comprise, for example, groups of floors in a building, individual buildings, or groups of buildings. The first classifier and the second classifier may include at least one of decision trees, Bayesian models, Nearest Neighbor, and Gaussian Mixtures.

Another aspect provides a system for determining a location of a mobile device within an indoor area, comprising a memory storing identifiers of a set of access points associated with an island, where the access points in an island are likely not visible outside that island, and a processor. The processor may be configured to build, for each island, a first classifier indicating a level of the indoor area, and build, for each level, a second classifier indicating a position on the level. According to one example, the first classifier comprises a first decision tree, an output of the first decision tree indicating the level of the indoor area, and the second classifier comprises a second decision tree, an output of the second decision tree indicating the position on the building level.

Another aspect provide a system for determining a location of a mobile device within an indoor area, comprising means for defining one or more islands, each island being a subdivision of a geographical region and including one or more access points, where any access point in an island is not visible outside that island. The system may further comprise means for maintaining identifiers of the access points associated with each island, means for building for each island, using a processor, a first decision tree, an output of the first decision tree indicating a level of the indoor area, and means for building for each level, using the processor, a second decision tree, an output of the second decision tree indicating a position on the level.

Yet another aspect of the technology provides a method for predicting location of a mobile device in an indoor area, comprising receiving signals from one or more access points, determining, using the received signals, an access point island in which the mobile device is located, downloading a first decision tree corresponding to the access point island, wherein an output of the first decision tree indicates a level of the indoor area, and executing the first decision tree using the received signals. The method may further comprise downloading a second decision tree corresponding to the level of the indoor area, wherein an output of the second decision tree indicates a position on the level, and executing the second decision tree using the received signals.

DETAILED DESCRIPTION

A mobile computing device may be localized in an indoor area based on the strength of wireless network signals accessible in the indoor area from different access points. For efficiency, the localization may be performed in stages. In a first stage, a general geographic area in which the mobile device is located, or an "island," is identified. In a second stage, an altitude or building level of the mobile device is identified. In a third stage, a position of the mobile device on the identified building level is determined. At least some of these stages of localization may utilize information received at the mobile device from surrounding access points. For example, the island on which the client device is located may be determined by identifying at least one access point on that island. Further, determination of a building level and a position on that level of a mobile device may be determined using any of a number of classifiers, such as decision trees, Bayesian models, Nearest Neighbor, Gaussian Mixtures etc. For example, decision trees may be executed using input related to a received signal strength from the surrounding access points, and outputs of the decision trees may indicate the device's location.

Figure 1:
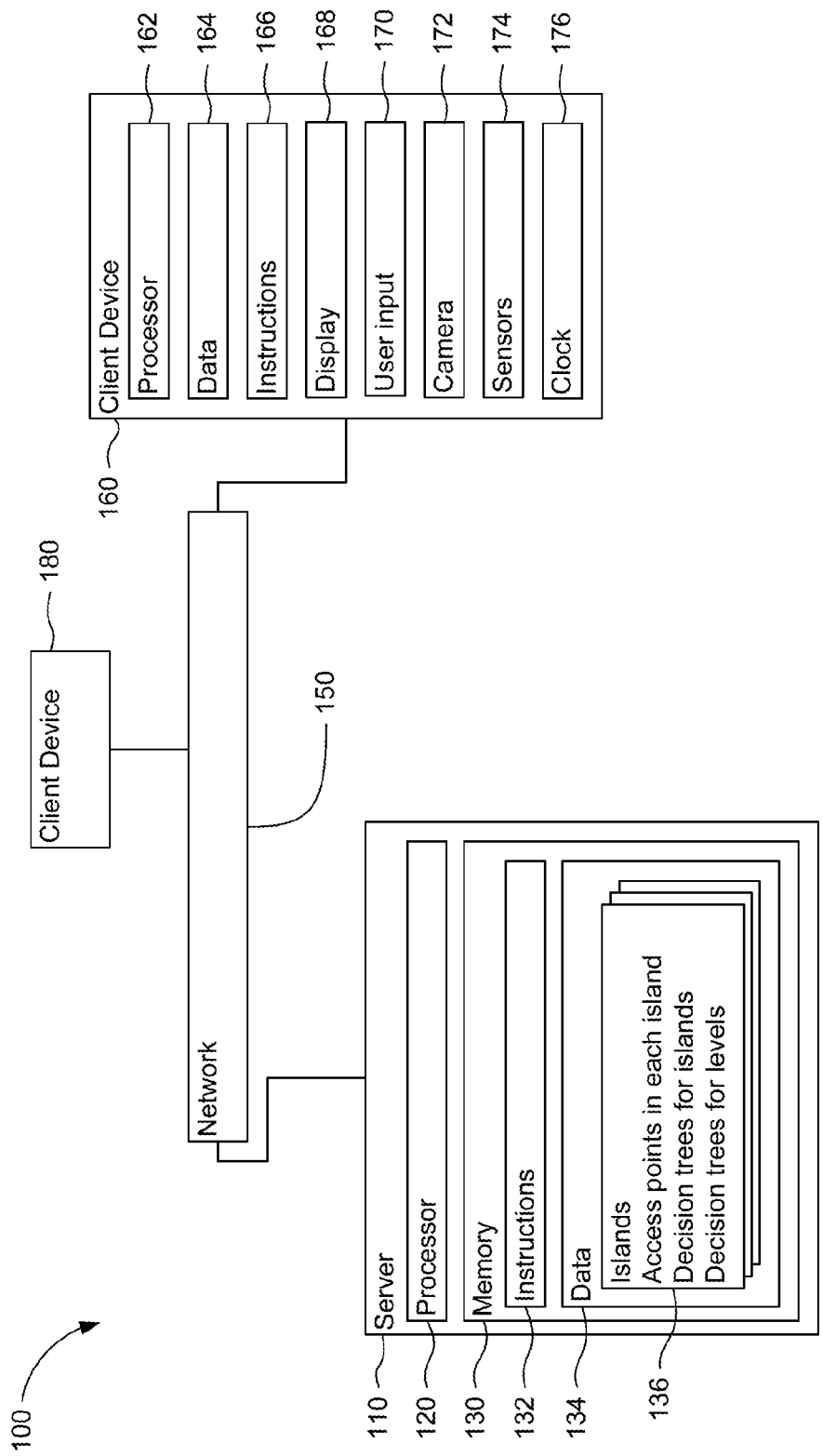
FIG. 1 is a functional diagram of a system according to an aspect of the technology.
Figure 2:
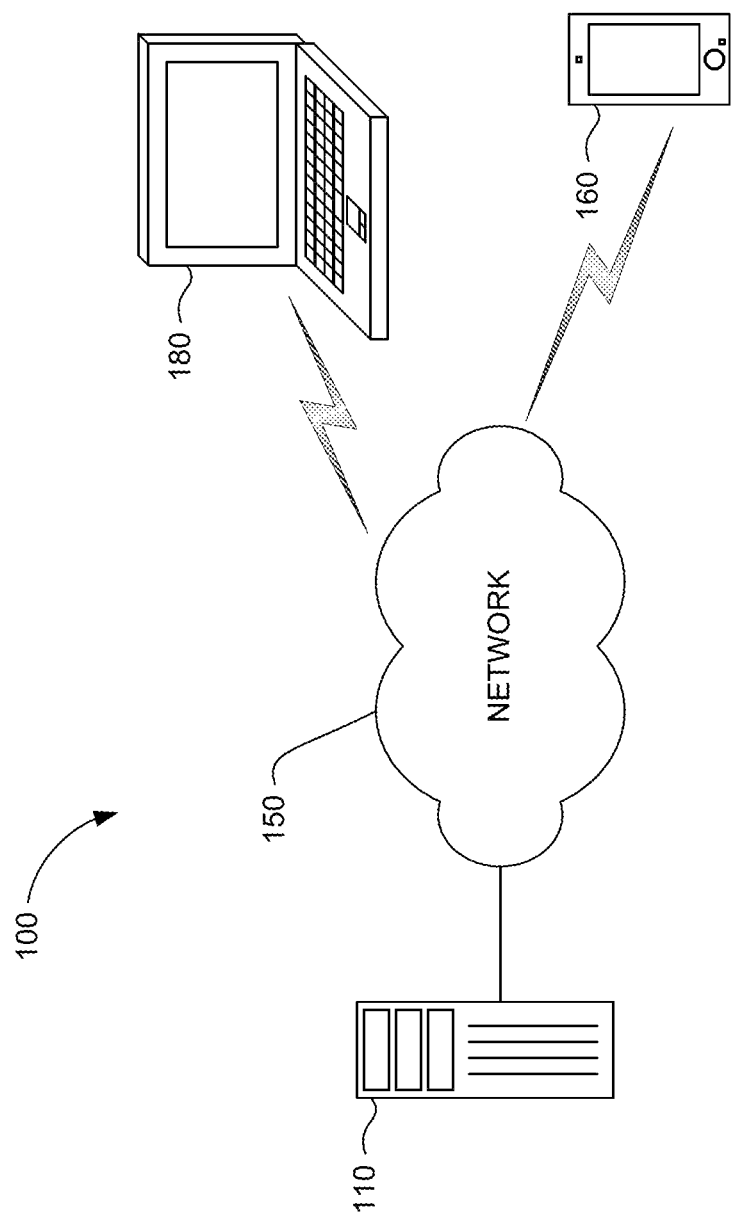
FIG. 2 is a pictorial diagram of the system of FIG. 1.

As shown in FIGS. 1-2, a system 100 in accordance with one aspect of the technology includes a server 110 containing a processor 120, memory 130 and other components typically present in general purpose computers.

The memory 130 stores information accessible by processor 120, including instructions 132, and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, flash drive, ROM, RAM, DVD or other optical disks, as well as other write-capable and read-only memories. In that regard, memory may include short term or temporary storage as well as long term or persistent storage. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored, or modified by processor 120 in accordance with the instructions 132. For instance, although the architecture is not limited by any particular data structure, the data may be stored in computer registers, in a relational database as a table having a plurality of different fields and records, XML documents or flat files. The data 134 may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data 134 may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as commercially available CPUs. Alternatively, the processor 120 may be a dedicated controller such as an ASIC or other hardware-based processor. Although FIG. 1 functionally illustrates the processor and memory as being within the same block, it will be understood by those of ordinary skill in the art that the processor and memory may actually comprise multiple processors and memories that may or may not be stored within the same physical housing. For example, memory 130 may be a hard drive or other storage media located in a server farm of a data center. Accordingly, references to a processor or computer or memory will be understood to include references to a collection of processors or computers or memories that may or may not operate in parallel.

The computer 110 may be at one node of a network 150 and capable of directly and indirectly receiving data from other nodes of the network 150. For example, server 110 may comprise a web server that is capable of receiving data from client devices 160 and 170 via network 150 such that server 110 uses network 150 to transmit and display information to a user on display 168 of client device 160. Server 110 may also comprise a plurality of computers that exchange information with different nodes of a network for the purpose of receiving, processing and transmitting data to the client devices. In this instance, the client devices 160, 180 will typically still be at different nodes of the network than any of the computers comprising server 110.

Network 150, and intervening nodes between server 110 and client devices 160, 180, may comprise various configurations and use various protocols including the Internet, World Wide Web, intranets, virtual private networks, local Ethernet networks, private networks using communication protocols proprietary to one or more companies, cellular and wireless networks (e.g., Wi-Fi), instant messaging, HTTP and SMTP, and various combinations of the foregoing. Although only a few computers are depicted in FIGS. 1-2, it should be appreciated that a typical system can include a large number of connected computers.

Each client device 160, 180 may be configured similarly to the server 110, with a processor, memory and instructions as described above. Each client device 160, 180 may be a personal computer intended for use by a person, and have all of the components normally used in connection with a personal computer such as a central processing unit (CPU) 162, memory (e.g., RAM and internal hard drives) storing data 164 and instructions 166, an electronic display 168 (e.g., a monitor having a screen, a touch-screen, a projector, a television, a computer printer or any other electrical device that is operable to display information), and end user input 170 (e.g., a mouse, keyboard, touch-screen or microphone). The client device may also include a camera 172, sensors 174 (e.g., position sensors, orientation sensors, accelerometer, gyroscope, light sensors, infrared sensors, etc.), speakers, a network interface device, a clock 176, a battery power supply or other power source, and all of the components used for connecting these elements to one another.

Although the client devices 160, 180 may each comprise a full-sized personal computer, they may alternatively comprise mobile devices capable of wirelessly exchanging data with a server over a network such as the Internet. By way of example only, client device 160 may be a wireless-enabled PDA or a cellular phone capable of obtaining information via the Internet. The user may input information using a small keyboard (in the case of a Blackberry-type phone), a keypad (in the case of a typical cellular phone) or a touch screen (in the case of a PDA).

The client devices may include an antenna and receiver which may be used to scan the Wireless network spectrum and identify local Wireless network signals. For example, the antenna may receive "beacon" messages and send them to the receiver which demodulates the information to identify wireless network access points. In one example, these beacon messages may be IEEE 802.11 management frames transmitted by access points to announce themselves to potential wireless network users. These frames may contain Service Set Identifiers ("SSID") information as well as physical layer parameters that assist devices in connecting to the wireless network. The beacon messages may also include additional network access information which also assists devices in accessing the network, including whether the access point is accepting new users, whether the data is encrypted, and which type of authentication is being used, for example, no authentication (open to all), password based, web-portable based, or Media Access Control ("MAC") address based. However, it will be understood that data collected in accordance with this disclosure may be limited to the information discussed above, for example MAC addresses, SSIDs or other identifiers and signal strengths, and need not contain additional information. For example, information contained in the network traffic or payload data, such as personal information, need not be collected, and in fact, may actually be removed in order to protect the privacy of the wireless network's users.

Data 164 and/or data 134 may include data usable to locate a mobile device in an indoor area. Examples of such data include an identification of access point islands and the access points included in each island, which may be used to predict a general location of the mobile device. Further examples include classifiers which may be used to predict a building level and position of a mobile device. One such classifier may be decision trees built for each island, which may be used to narrow the predicted location to a building level, and decision trees built for each building level, which may be used to narrow the predicted location further to a position on the predicted building level.

An access point island may be a predefined subdivision of a geographical region (e.g., an area having general latitudinal, longitudinal, and altitudinal boundaries). For example, an access point island may be a group of levels in a building, a building, a cluster of buildings, etc. The access points included in each island may be exclusive to that island, and beacons or other signals transmitted by the access points may not reach outside the island. The access points may be identified by, for example, MAC address or Extended Unique Identifier (EUI). Accordingly, as discussed herein, if a mobile device detects a given access point, the island on which the mobile device is located may be determined.

According to one aspect, the data 164 and/or data 134 may further include fingerprint data identified through scanning of wireless networks. For example, a client device may traverse multiple levels and positions in an indoor area. At each level and/or position, the client device may perform a scan and record MAC addresses and respective signal strength of nearby access points. This data may be used to generate maps correlating the signal strength of the access points with the levels and positions in the indoor area. Fingerprint data may include, alternatively or additionally, information related to other attributes of the indoor area, such as light, temperature, noise, etc.

The fingerprint data may be used to build decision trees correlating input relating to the access points to an output indicating a building level or position. According to one aspect, one or more such decision trees may be built for each island to indicate a particular building level of the island. One example of such a decision tree is provided in FIG. 6. Further, one or more decision trees may be built for each building level to indicate a particular position on the building level. One example of such a decision tree is provided in FIG. 7. Accordingly, the data 136 enables prediction of an island on which the mobile device is located, a particular building level of that island, and a particular position on that building level.

Figure 3A:
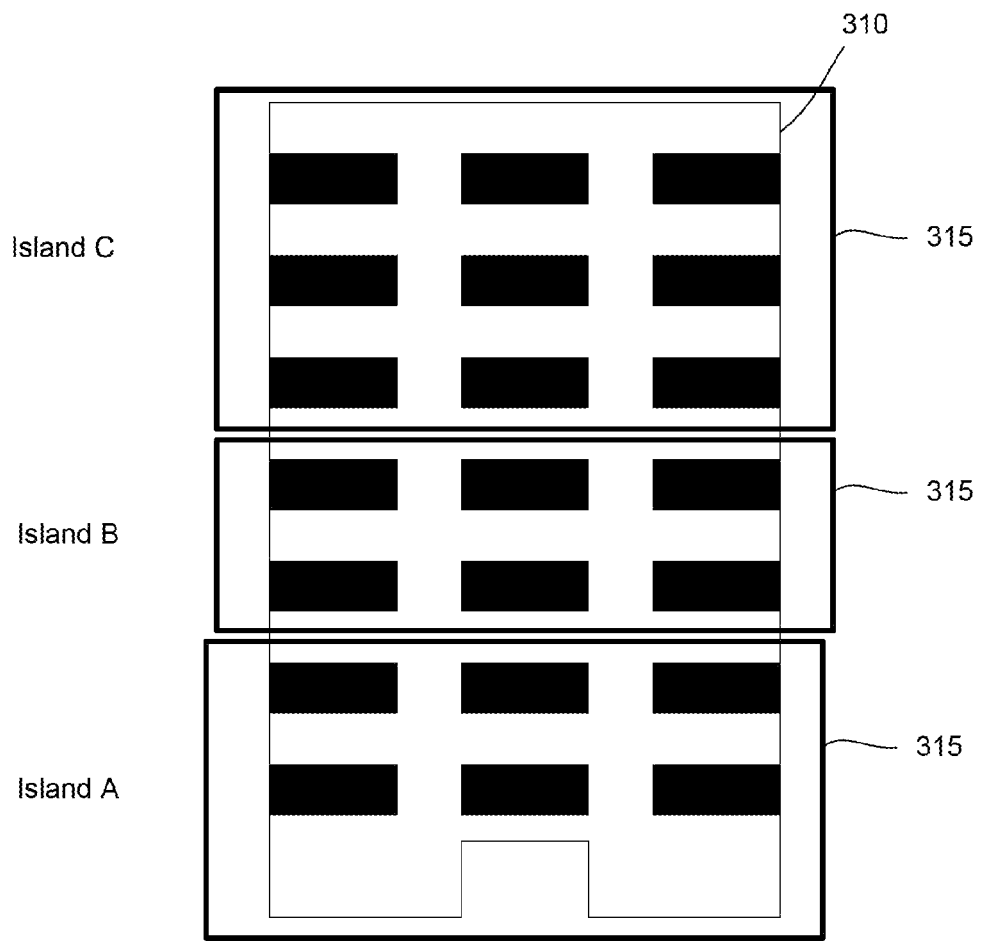
FIG. 3A is an illustrative diagram of access point islands according to an aspect of the technology.
Figure 3B:
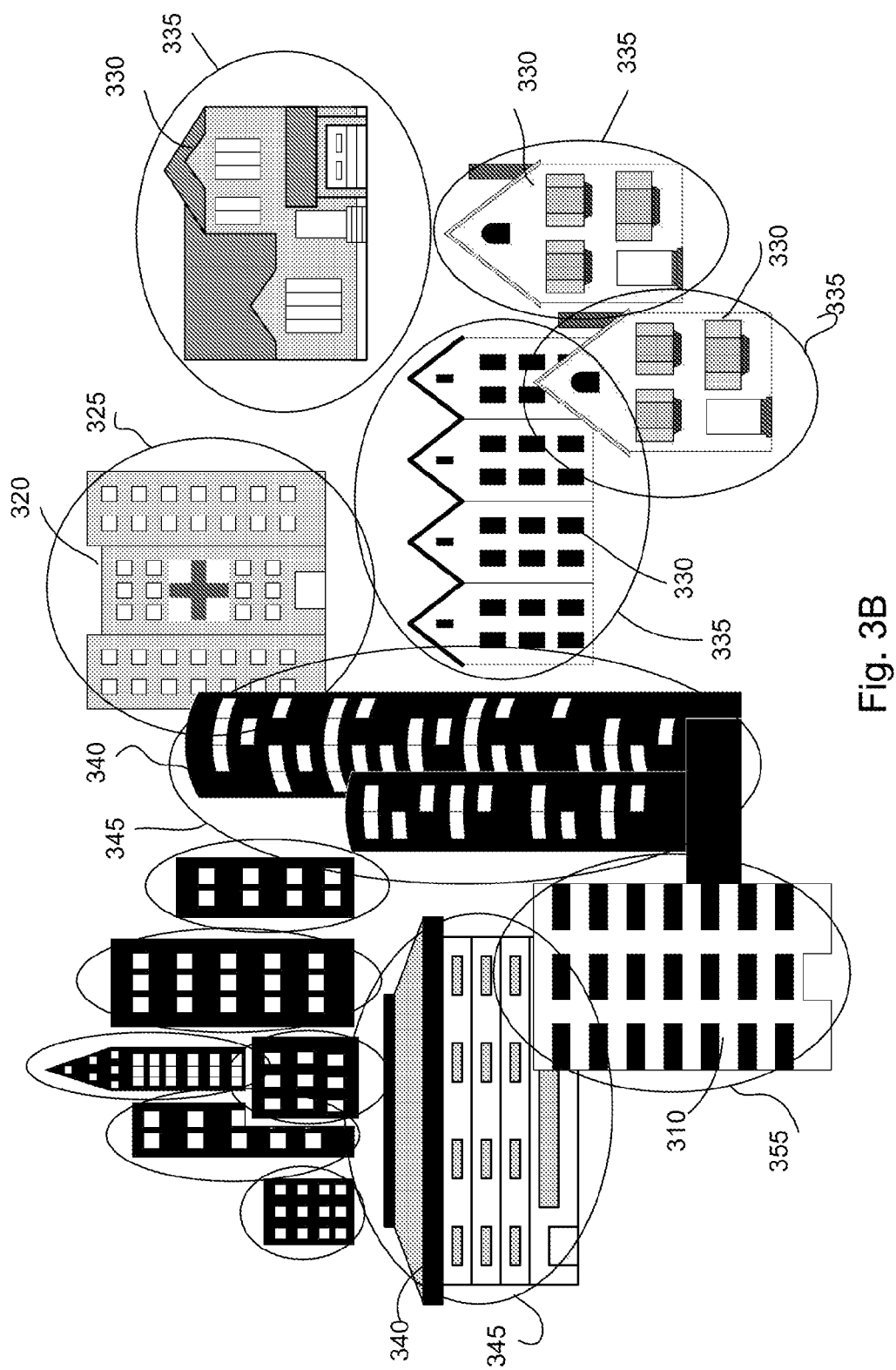
FIG. 3B is an illustrative diagram of access point islands according to another aspect of the technology.
Figure 3C:
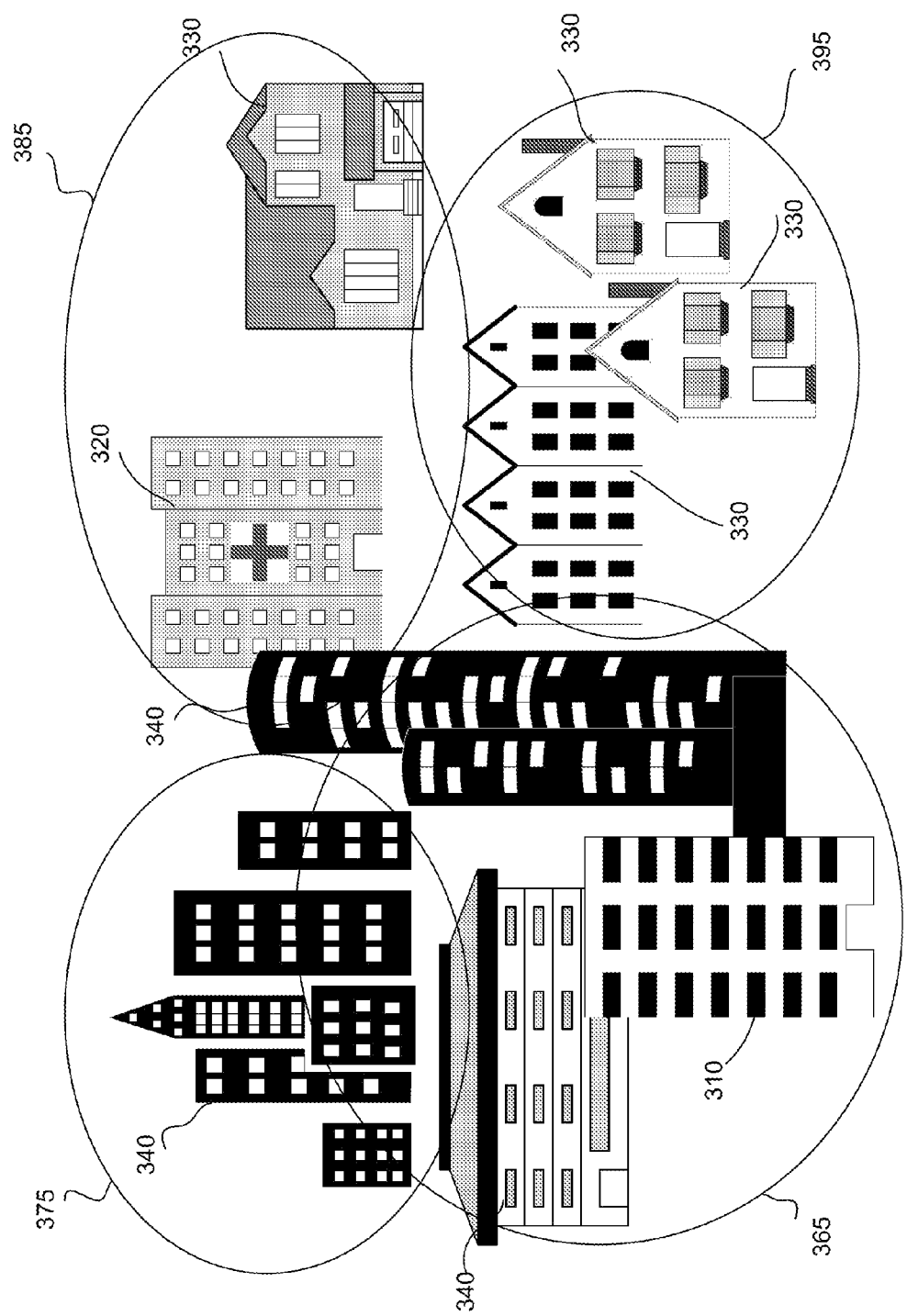
FIG. 3C is an illustrative diagram of access point islands according to another aspect of the technology.

FIGS. 3A-3C provide examples of access point islands according to aspects of the technology. As shown in FIG. 3A, a building 310 include multiples levels, which may be grouped into access point islands 315. Any number of levels may be included in an island. While the islands 315 are shown as encompassing the entirety of several floors, it should be understood that according to some aspects an island may only encompass a portion of multiple levels. For example, a first island may include the eastern half of levels 0-3, while a second island includes the western half of levels 0-3.

According to the embodiment shown in FIG. 3B, access point islands may include entire buildings. For example, building 310 may be designated in access point island 355, city buildings 340 may be designated in access point islands 345, hospital 320 may be designated in access point island 325, and residences 330 may each be designated in their own respective islands 335.

According to a further embodiment shown in FIG. 3C, access point islands may be designated to include multiple buildings in a geographic area. For example, each island 365, 375, 385, 395 may include a plurality of nearby buildings.

For each access point island, a list of the access points in that island may be stored, for example, at the server 110. According to one embodiment, each access point may only be identified on one list, because the access points in each island may not be visible outside of that island. These lists may be used to determine on which island a mobile device is located. For example, an access point detected by the mobile device may be compared to the access points on each list. When a match is found on one list, the island corresponding to that list may be identified as the island on which the mobile device is located.

In some instances, it may not be possible to perfectly divide access point islands such that no access point in one island is visible outside that island. In such instances, an access point may be included in the island with which it is most frequently associated. For example, if signals from an access point A are nearly always received by mobile devices in Island A, but are only sometimes received by mobile devices in Island B, the access point A may be included in Island A.

Additionally, in some instances a mobile device may receive spurious data. Accordingly, the island may be identified using most or all of the access points detected by the mobile device. For example, a mobile device may receive signals from five access points (AP1-AP5). However, the first four access points AP1-AP5 may be associated with Island A, while AP5 is associated with Island B. Because a majority of the visible access points are in Island A, the mobile device may be determined to also be in Island A.

Figure 4:
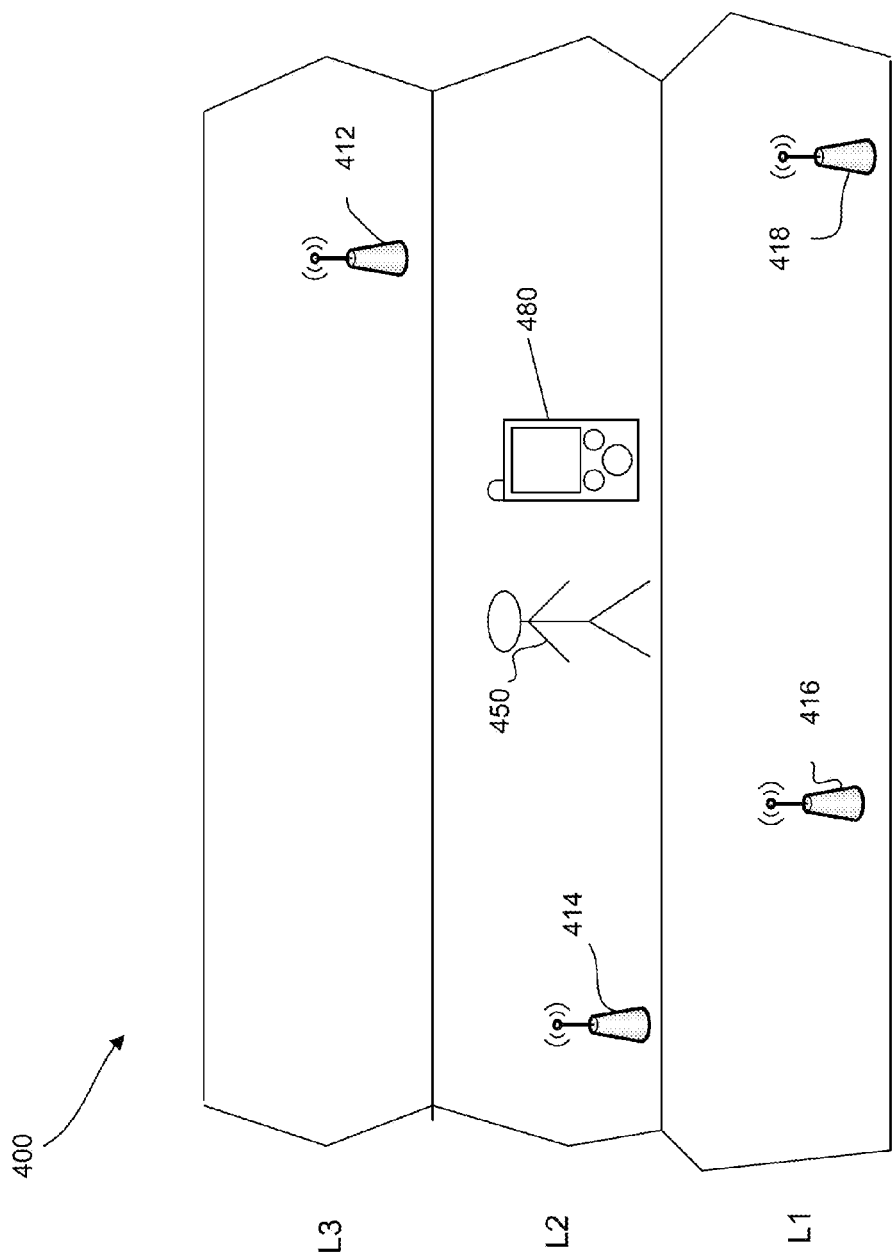
FIG. 4 is an exemplary diagram of access point distribution on multiple levels of an indoor area according to an aspect of the technology.

Once the access point island in which the mobile device is located is identified, an altitude or building level on which the mobile device is located may be determined. For example, as shown in FIG. 4, an access point island 400 includes building levels L1, L2, and L3. Each level may include one or more access points. For example, level L1 includes access points 416 and 418, level L2 includes access point 414, and level L3 includes access point 412. The access points 412-418 may be any type of conventional access point, and need not all be the same as one another.

The access points 412-418 may each have a unique identifier, such as a MAC address, and transmit signals including the unique identifier for a predetermined distance. Signals transmitted by these access points 412-418 may be received by a mobile device 480 and used to determine on which level a user 450 is located. For example, strengths of each received signal may be analyzed to determine the user's level. According to one aspect which will be explained in further detail with respect to FIG. 6, the analysis of received signal strengths may be performed using one or more decision trees.

Figure 5:
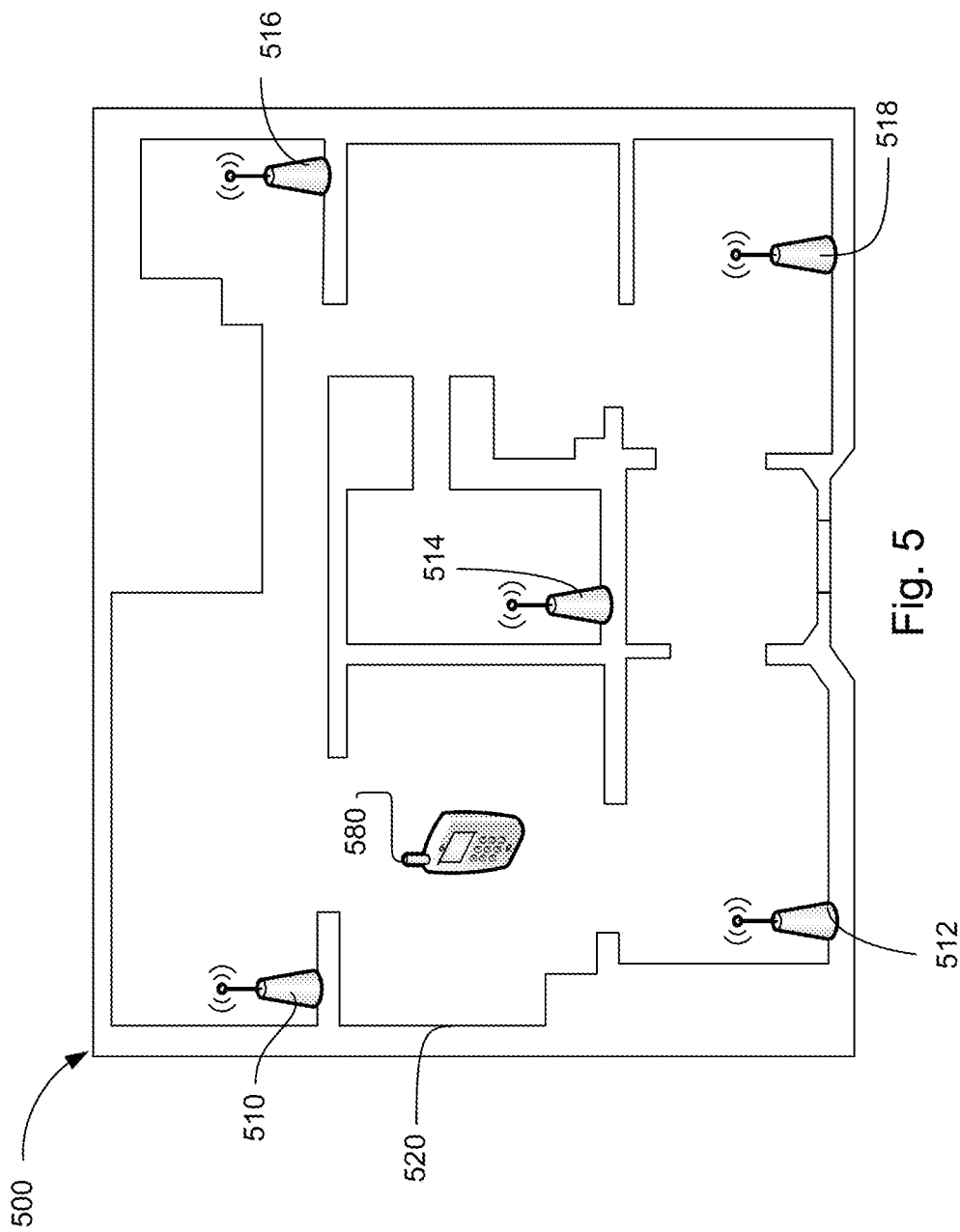
FIG. 5 is an exemplary diagram of a floor plan layout for a given level of an indoor area according to an aspect of the technology.

Once the level on which the mobile device is located is determined, a position of the mobile device may be estimated. FIG. 5 illustrates an exemplary floorplan layout of an indoor area 500 on a level of a building. The area 500 includes a plurality rooms separated by walls 520, and a plurality of access points 510, 512, 514, 516, 518 in various positions throughout the indoor area 500. The access points 510-518 may each have a unique identifier, such as a MAC address, and transmit signals for a predetermined distance. The access points 510-518 may be any type of conventional access point, and need not all be the same as one another.

A mobile device 380 receive signals from one or more of the access points 510-518, depending on its position in the indoor area 500. Some of the received signals may be stronger than others. The received signals may be analyzed to estimate a location of the mobile device 580. For example, the received signals may be compared to a predetermined mapping of the signal strengths at various points throughout the area 500, and a location of the mobile device 580 may be estimated based on the comparison. According to one aspect, described in further detail with respect to FIG. 7, the analysis of the received signals may include execution of one or more decision trees.

Figure 6:
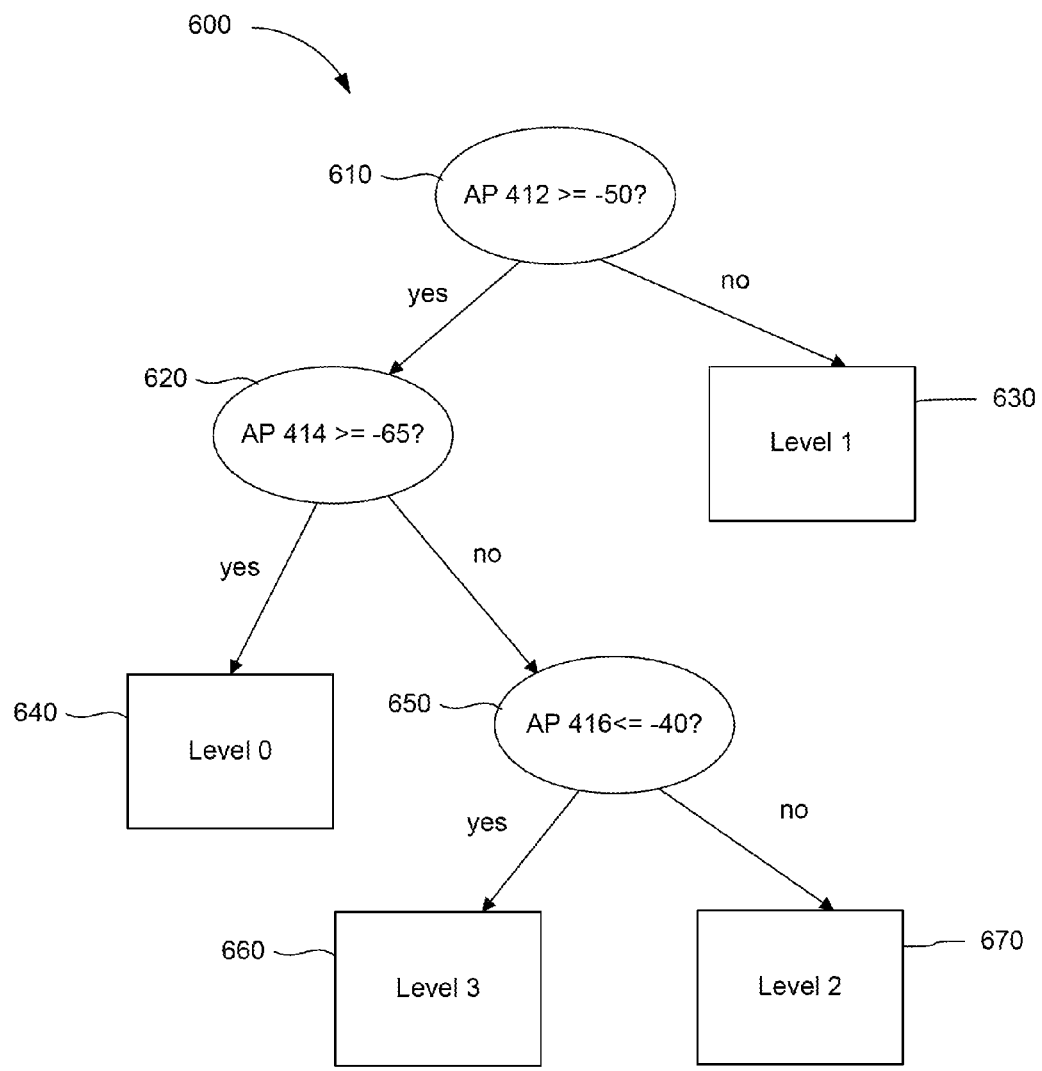
FIG. 6 is an exemplary decision tree according to an aspect of the technology.

FIG. 6 provides an exemplary decision tree 600 for determining a building level on which a mobile device is located. The decision tree 600 includes a starting node 610, intermediate nodes 620, 650, and output nodes 630, 640, 660, 670. The starting node 610 and intermediate nodes 620, 650 may present questions, the answers to which determine the next node in the tree 600. For example, referring back to FIG. 4, starting node 610 asks whether a signal received by the mobile device 480 from access point 412 is greater than or equal to a particular power ratio, such as −50 dBm. If "no," it is estimated in output node 630 that the user 450 is located on level L1. However, if the answer is "yes," intermediate node 620 asks whether the signal received from access point 414 is greater than or equal to −65 dBm. If this returns true, it is estimated at output node 640 that the user 450 is located on level L2. If false, intermediate node 650 asks whether the signal received from access point 416 is less than or equal to −40 dBm. The answer to this may determine whether the user 450 is located on level L3 (output node 660) or level L2 (output node 670).

Figure 7:
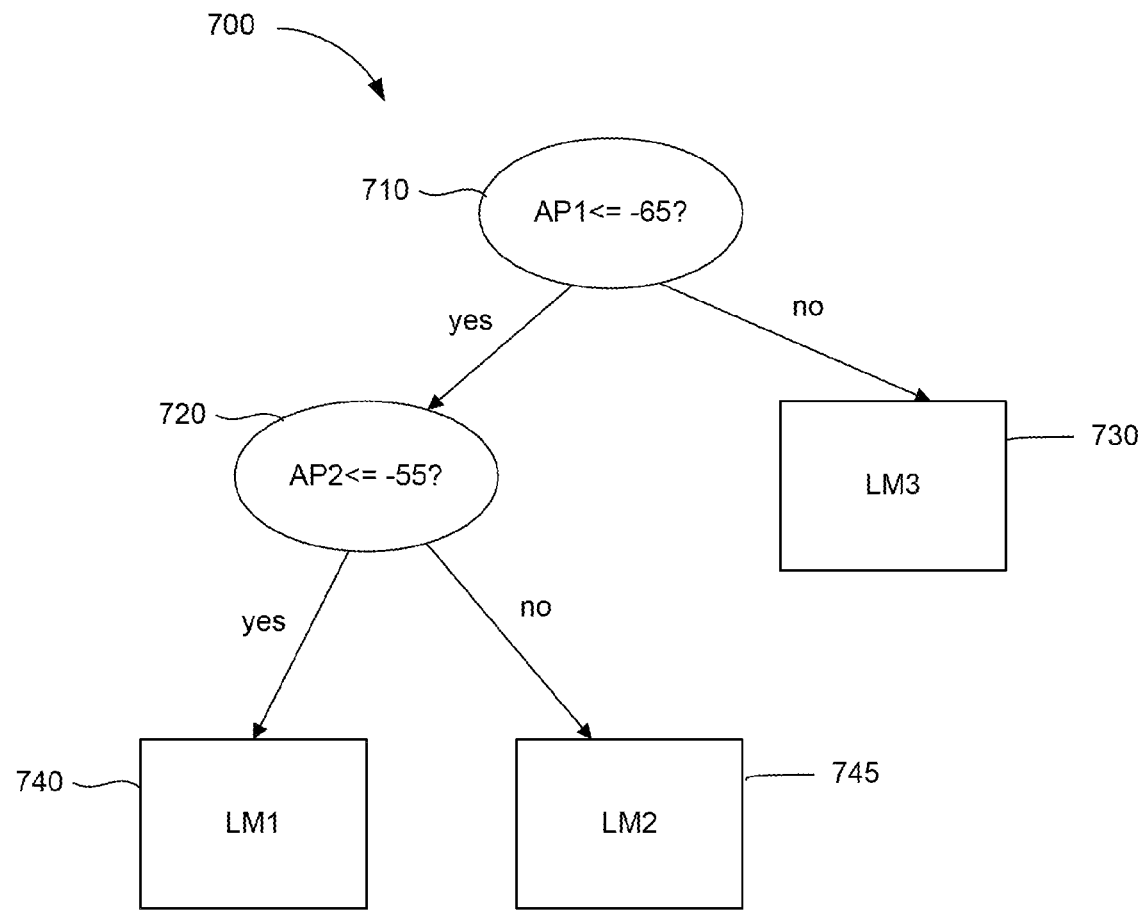
FIG. 7 is an exemplary decision tree according to another aspect of the technology.

Once it is determined on which level the user 450 is located, the user's position on that level may be determined. This may involve execution of further decision trees. For example, as shown in FIG. 7, an exemplary decision tree 700 may correlate variations access point signal strength with a position on a level of an indoor area.

Similar to the decision tree 600 of FIG. 6, the decision tree 700 may include a starting node 710, one or more intermediate nodes 720, and one or more output nodes 730, 740, 745. The starting node 710 may present a question, the answer to which determines the next node. For example, referring back to FIG. 5, the question may be whether a received signal strength of a first access point AP1 (e.g., access point 510) is less than or equal to a particular power ratio, such as −65 dBm. If this is true, the next node may be intermediate node 720, which asks a further question related to the received signal strength from a second access point AP2, such as access point 514. However, returning to node 710, if it is false, the next node may be output node 730.

The output nodes 730, 740, 745 may provide information indicating a position based on the answers to the questions of the starting node 510 and any intermediate nodes (e.g., node 720). For example, the output nodes 730, 740, 745 each indicate one of the equations below, which may be used to calculate location:

$LM1$: $LM1$ latitude=45.124525−0.0043*$ap1$+ 0.0025*$ap3$ $LM2$: $LM2$ latitude=45.124888−0.0012*$ap2$− 0.0042*$ap3$ $LM3$: $LM3$ latitude=45.124525−0.0047*$ap1$− 0.0080*$ap2$ According to some aspects, the output may be a longitudinal and/or latitudinal coordinate, a point on a map, or a relative location (e.g., 5' from East wall and 7.5° from North wall of building).

Although only two intermediate nodes 620, 650 are shown in FIG. 6 and one intermediate node 720 is shown in FIG. 7, it should be understood that any number of intermediate nodes may be included in the decision trees 600,700, thereby increasing the potential number of output nodes. Moreover, while the exemplary decision trees 660, 700 indicate a level and a position based on questions related to received signal strength of one or more access points, it should be understood that the questions may relate to any attribute. For example, the decision trees 600, 700 may correlate a lighting or noise level, or factors related to a mobile device or its user, to a level and position of a mobile device. According to some aspects, the decision trees 600, 700 may each use a combination of these factors to predict location.

According to one aspect, multiple decision trees may be generated to more accurately predict a level and/or a position of a mobile device in an indoor area. For example, the decision trees may analyze various subsets of data, and the outputs from all the decision trees may be averaged. The various subsets of data may include, for example, varying the access points that are analyzed, varying an order in which access points are analyzed, varying the received signal strength values, or a combination of these. Further, some of the decision trees may relate to different attributes, as discussed above.

Although FIGS. 6 and 7 provide detailed examples of decision trees that may be used to predict a device's building level and position in an island, it should be understood that any of a number of classifiers may be used. For example, building level and position may be determined using Bayesian models, Nearest Neighbor, Gaussian Mixtures, or some combination of these.

Methods of predicting a user's indoor level and location, for example using the access point islands and decision trees discussed above, will now be described. It should be understood that the operations of these methods do not have to be performed in the precise order described below. Rather, various operations can be handled in a different order or simultaneously, and operations may be added or omitted. Moreover, as mentioned above, decision trees are merely one example of how location within an island may be determined.

Figure 8:
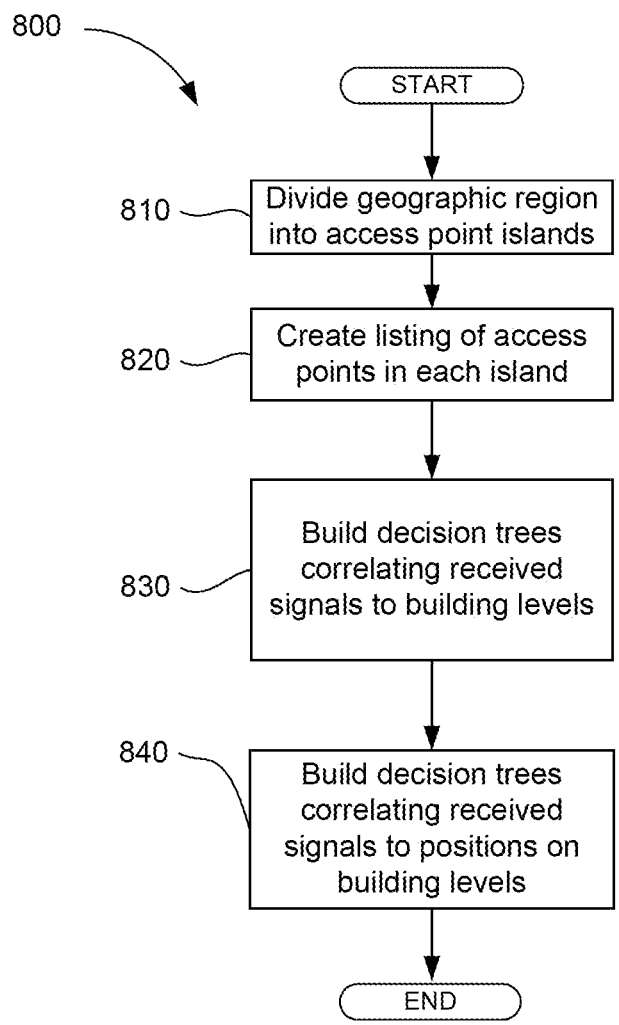
FIG. 8 is a flow diagram of a method according to an aspect of the technology.

FIG. 8 provides a flow diagram of a method 800 according to an aspect of the technology. This method provides for predicting an indoor location of a mobile device using one or more decision trees. The method 800 may be performed by any computing device, including a client device, a remote server, or some combination of these.

The method 800 begins at block 810, where a geographic region is divided into access point islands. The geographic region may be any area, such as a particular building, a group of buildings, a city block, a town, a city, a country, or the entire world. The access point islands may be divided as broadly or narrowly as desired. For example, the islands may be a group of floors in a building (e.g., as in FIG. 3A), a building (e.g., as in FIG. 3B), a group of buildings (e.g., as in FIG. 3C) or the like.

Each island may include one or more access points. The access points in each island may not be visible outside the island. For example, referring back to FIG. 3A, a mobile device located in Island B may not receive signals from any access points in Island A or Island C.

In block 820, the access points in each island may be noted. For example, these access points may be identified by MAC address or extended unique identifier (EUI). The access points in each island may be indexed, for example, in a list, table, or other format.

As discussed above, each island may include a plurality of building levels. In block 830, one or more decision trees, such as the tree 600 of FIG. 6 may be built for each island to isolate a level on which the user is located. For example, at different levels of a building, signal strengths from different access points (e.g., Wi-Fi, Bluetooth, radio, or other access points) may vary. Referring to the example of FIG. 4, a signal from access point 416 may be much stronger on level L1 than on level L3. Such variations may be identified, for example, using a mobile device which traverses throughout the building levels and may be used to generate a mapping of the access point signal strengths. The decision trees may correlate the received signal strength of the access points with a particular building level in the island. Alternatively or additionally to received signal strength, the decision trees may correlate any of a variety of other attributes with a building level, such as barometric pressure, altitude, etc.

One or more decision trees, such as the tree 700 of FIG. 7, may also be built to predict a position of a mobile device on a given building level (block 840). For example, for each building level, variations in signals received from access point may be identified at different positions on the level. The decision trees may correlate these variations with positions on the level.

According to one aspect of the technology, multiple decision trees may be built to determine a single building level or position. The multiple decision trees may each analyze a different set of data, or may analyze data in a different sequence. For example, the different sets of data may include varying the access points that are analyzed, varying an order in which access points are analyzed, varying the received signal strength values, or a combination of these. Further, some of the decision trees may relate to additional attributes, such as lighting or noise level. While any number of decision trees may be used, a trade-off between efficiency and accuracy make take place as the number of trees increases. Thus, for example, a building level or position may be determined using 10-15 decision trees.

Figure 9:
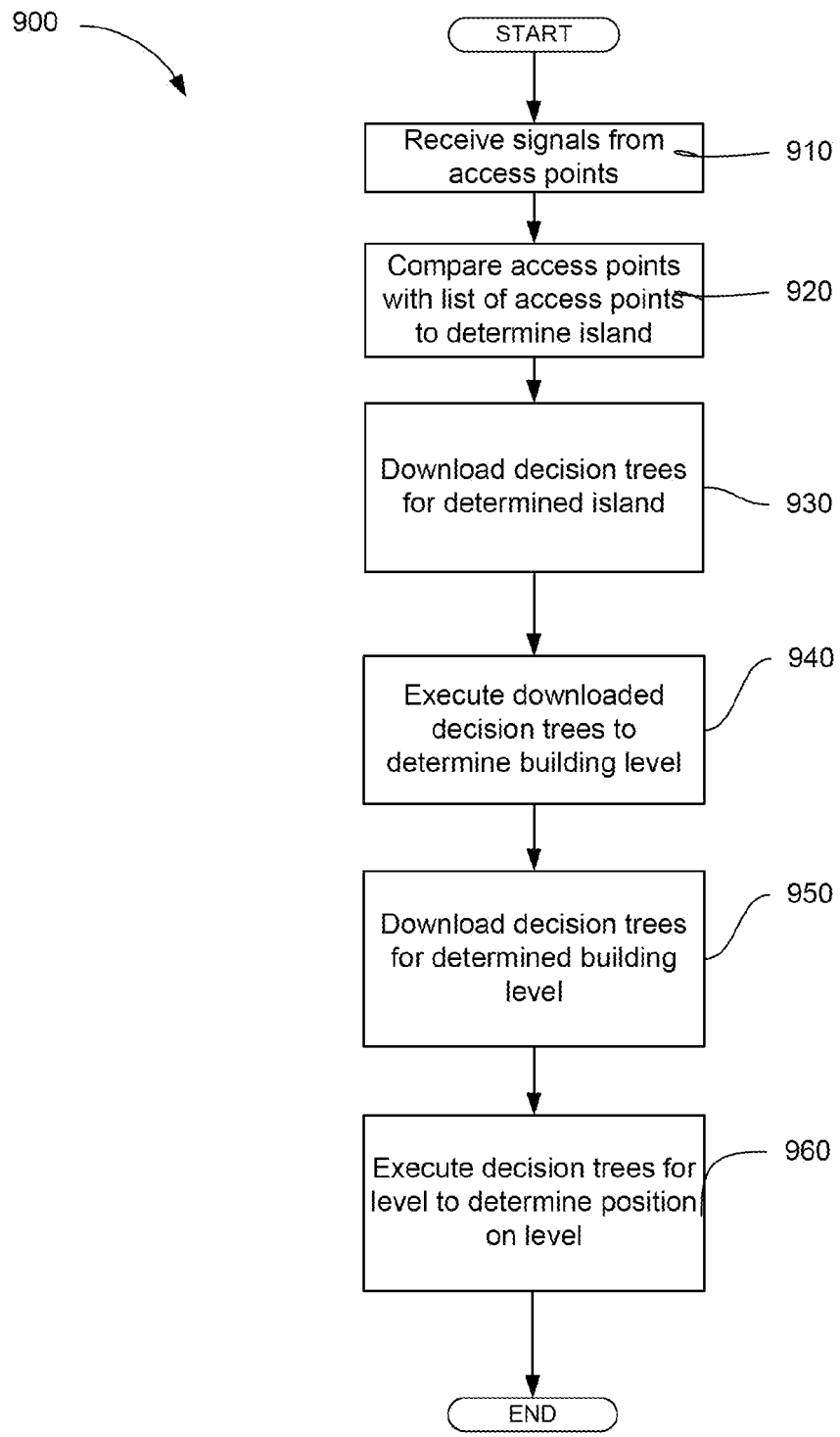
FIG. 9 is a flow diagram of another method according to an aspect of the technology.

FIG. 9 illustrates another method 900 for predicting an indoor location of a mobile device. According to this method 900, a mobile device may exchange information with a remote server in order to determine its location. Preferably, privacy protections are provided for any user data transmitted by the mobile device, including, for example, anonymization of personally identifiable information, aggregation of data, filtering of sensitive information, encryption, hashing or filtering of sensitive information to remove personal attributes, time limitations on storage of information, or limitations on data use or sharing. The data may be anonymized and aggregated such that individual user data is not revealed.

According to one aspect, once the mobile device's location is predicted, it may be displayed to the user. For example, a display of the mobile device may provide a text description of the location (e.g., "Building 1, 3$^{rd}$ floor, Room 302"), an illustration (e.g., a floorplan of the building level and a dot or other mark indicating the device's location), or some combination of these. Such information may be beneficial to a user who, for example, is trying to find a particular room or place in an indoor area (e.g., a doctor's office, an art exhibit, a store in a shopping mall, etc.).

Figure 10:
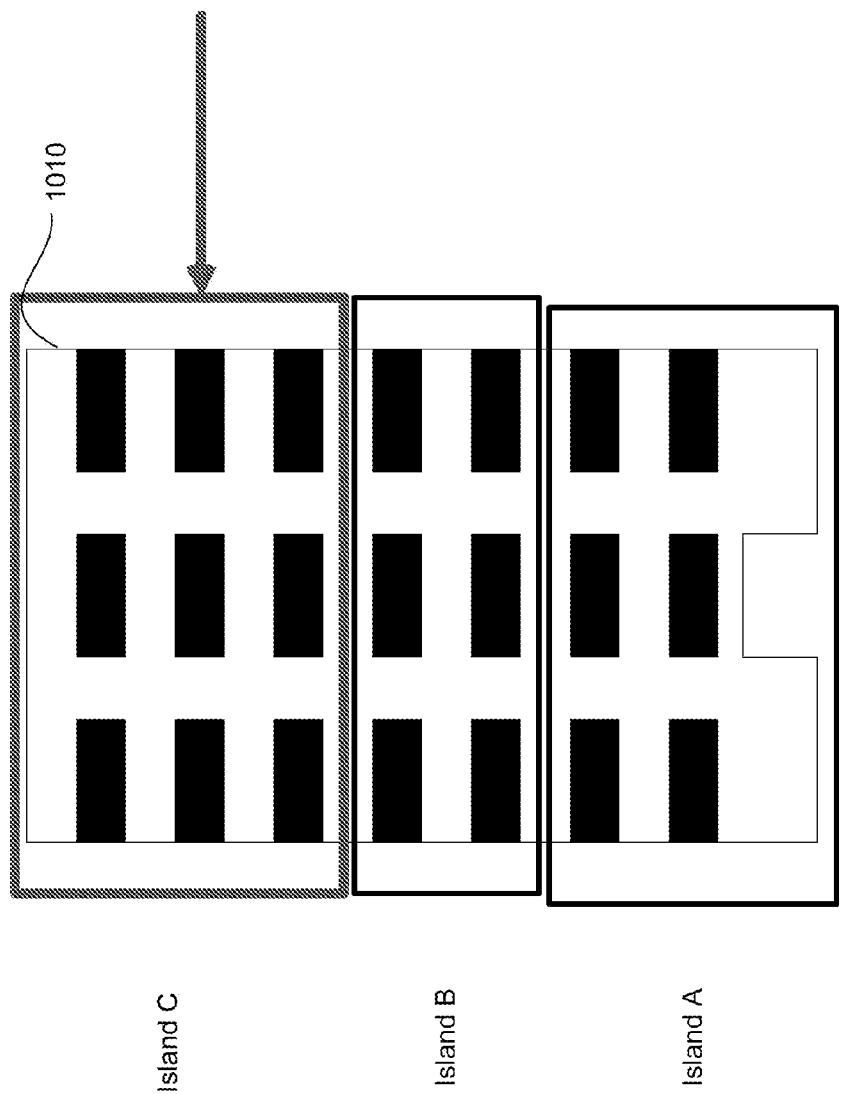
FIG. 10 is an exemplary diagram of an access point island identified according to an aspect of the technology.

In block 910, the mobile device may receive signals from one or more access points. The access points may be identified by the mobile device using, for example, MAC address or EUI. These access points may then be compared to a list of access points, such as the list created in block 820 of FIG. 8, to determine on which island the mobile device is located (block 920). For example, as shown in FIG. 10, the user of the mobile device may be located within building 1010, which is divided into Island A, Island B, and Island C. Each of these islands may include access points which are not visible outside of the island. For example, the access points in Island A may transmit signals which may only be received by devices in Island A, and not devices in Island B or Island C. According to the example of FIG. 10, the user may receive a signal from one or more access points in Island C. A comparison of the one or more access points to a predetermined list may indicate that the one or more access points and the mobile device are located in Island C.

Once the island is determined, decision trees (e.g., the decision tree 600 of FIG. 6) for that island may be downloaded (block 930). The decision trees may be stored in a remote server and downloaded as needed. Because only decision trees for a particular island are needed, and because the decision trees do not consume a great deal of resources, the trees may be downloaded fairly quickly. Alternatively, the decision trees may be stored on the mobile device semi-permanently, for example, if a user desires to continually determine his location in a given building.

Figure 11:
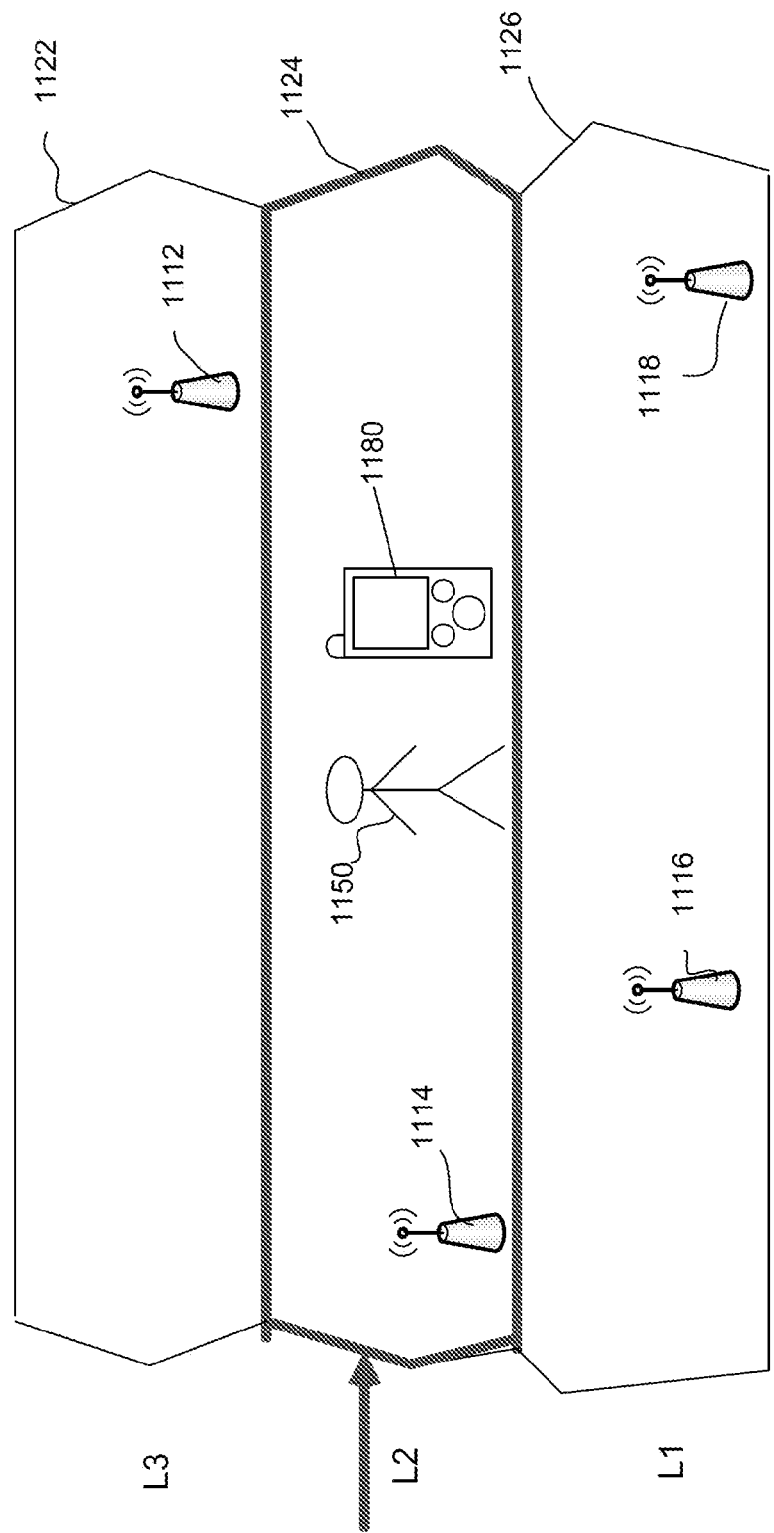
FIG. 11 is an exemplary diagram of a building level identified according to an aspect of the technology.

The decision trees may be executing using, for example, the received signal strengths of surrounding access points (block 940). FIG. 11 provides an example of user 1150 and mobile device 1180 on a given island (e.g., Island C of FIG. 10). The island includes multiple levels 1122 (L8), 1124 (L7), 1126 (L6). L8 includes access point 1112, L7 includes access point 1114, and L6 includes access points 1116 and 1118. The mobile device 1180 may receive signals from each of these access points 1112-1118, though the signals may vary in strength as a function of at least a distance between the device 1180 and the access points 1112-1118. Starting and intermediate nodes of the decision trees may process information related to these signals as input. An output of the decision trees may indicate the mobile device's building level. Thus, in the example of FIG. 11, the mobile device 1180 may execute the decision trees and determine that it is located on level L7.

Figure 12:
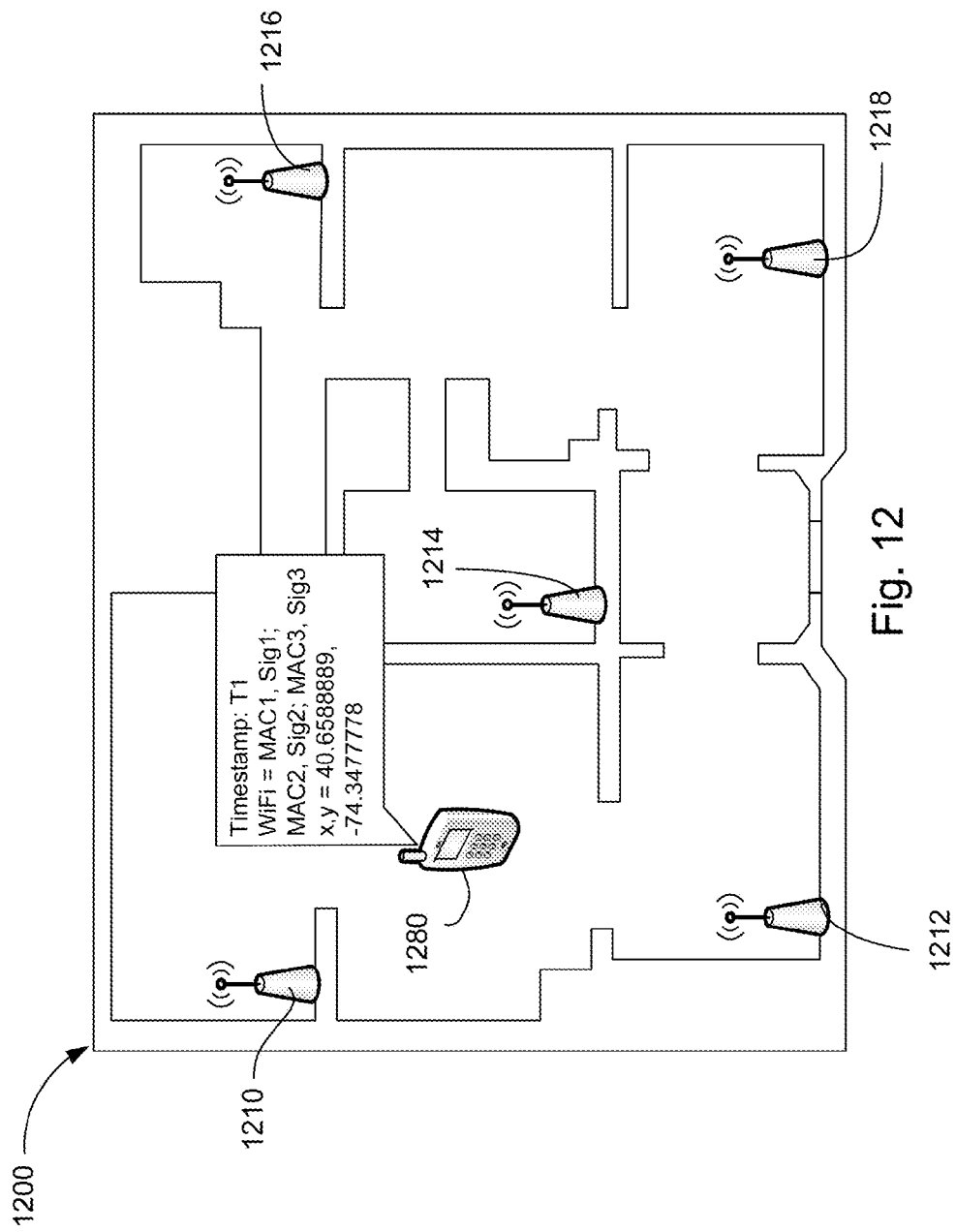
FIG. 12 is an exemplary diagram of a mobile device located within an indoor area according to an aspect of the technology.

In block 950, decision trees (e.g., the decision tree 700 of FIG. 7) for the indicated building level may be downloaded. These trees may be executed to determine the mobile device's position on the building level (block 960). For example, the trees may use data related to received signal strength from surrounding access points as input, and may output an indication of position. FIG. 12 illustrates an example of an indoor area 1200 on a given building level (e.g., L7 of FIG. 11). The indoor area includes access points 1210, 1212, 1214, 1216, 1218. Mobile device 1280 may receive signals from the access points 1210, 1212, 1214, but may be out of range of the access points 1216, 1218. This information may be input to one or more decision trees built for the indoor area 1200, and the output may indicate a position of the mobile device 1280. For example, as shown, the output is indicated as latitude and longitude. However, the position may be indicated in coordinates relative to the indoor area 1200, or in any other way. For example, the mobile device 1280 may display a diagram of the indoor area 1200 on its screen, and its current position may be denoted as a red dot or the like.

According to one aspect, the above-described methods of predicting a user's indoor location may be executed periodically or continually to trace a movement of a mobile device.

Figure 13:
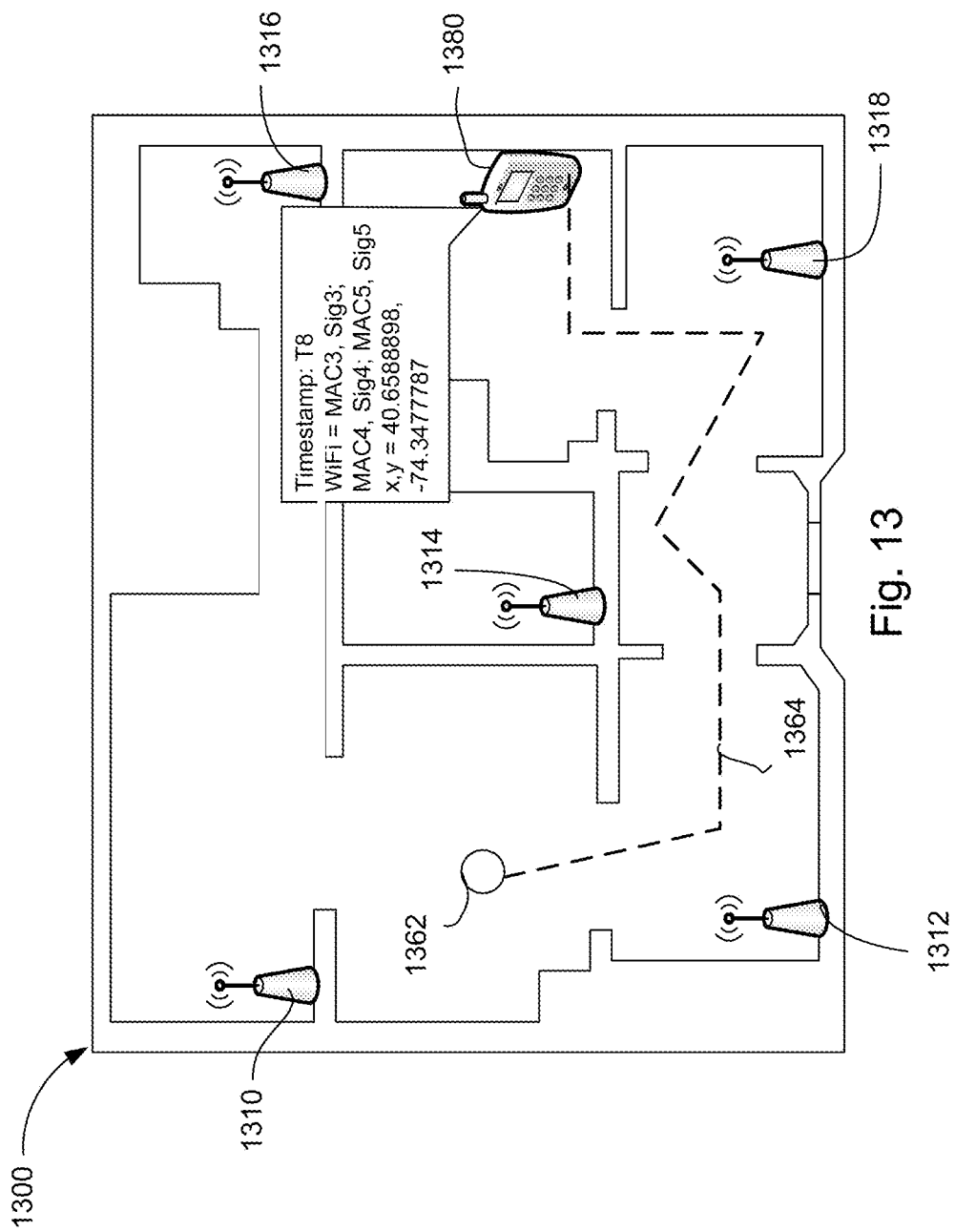
FIG. 13 is an exemplary diagram of a mobile device being tracked within an indoor area according to an aspect of the technology.

For example, as shown in FIG. 13, a mobile device 1380 may move throughout an indoor area 1300, and receive signals of varying strengths from different access points 1310, 1312, 1314, 1316, 1318 along the way. The mobile device 1380 may thus be traced from a starting point 1362 along a path 1364 by executing decision trees at one or more points along the path 1364. With the consent of the user, the mobile device 138 may also store a record of its movements, for example, by recording each decision tree output along with a timestamp.

Using decision trees to predict a location of a user within an indoor area may be advantageous in that the decision trees do not consume a great deal of resources, they may be executed quickly, and they make choices about which inputs are relevant locally, rather than globally. Additionally, an accuracy of the location predictions made using the decision trees may be increased by executing a plurality of trees and averaging the result.

As these and other variations and combinations of the features discussed above can be utilized without departing from the technology as defined by the claims, the foregoing description of exemplary embodiments should be taken by way of illustration rather than by way of limitation of the technology as defined by the claims. It will also be understood that the provision of examples of the technology (as well as clauses phrased as "such as," "e.g.", "including" and the like) should not be interpreted as limiting the technology to the specific examples. Rather, the examples are intended to illustrate only some of many possible aspects.

The invention claimed is:

1. A method, comprising:
    defining one or more islands, each island being a subdivision of a geographical region and including one or more access points, where any access point in an island is likely not visible outside that island;
    maintaining identifiers of the access points associated with each island;
    building for each island, using a processor, a first classifier, the first classifier including one or more decision trees executable using at least one signal received by a mobile device, the output of the one or more decision trees of the first classifier indicating a level of the indoor area; and
    building for each level, using the processor, a second classifier, a second classifier including one or more decision trees executable using the at least one signal received by the mobile device, the output of the one or more decision trees of the second classifier indicating a position on the level.

2. The method of claim 1, wherein the islands comprise groups of floors in a building.

3. The method of claim 1, wherein the islands comprise individual buildings.

4. The method of claim 1, wherein the islands comprise groups of buildings.

5. The method of claim 1, wherein the one or more decision trees included in the first and second classifiers comprise:
    starting nodes, the starting nodes presenting first questions related to received signal strengths of access points; and
    intermediate nodes, each intermediate node presenting an additional question related to the received signal strengths of access points.

6. The method of claim 5, wherein the first and additional questions ask whether the received signal strength of one or more particular access points is above or below one or more predetermined values.

7. The method of claim 1, further comprising:
    building a plurality of first decision trees for inclusion in the first classifier; and
    averaging results from the plurality of first decision trees.

8. The method of claim 1, further comprising:
    building a plurality of second decision trees for inclusion in the second classifier; and
    averaging results from the plurality of second decision trees.

9. The method of claim 1, further comprising:
    receiving from a mobile device an identifier of at least one access point;
    comparing the received identifier to the maintained identifiers to determine the island in which the mobile device is located.

10. The method of claim 1, wherein the position indicated by the second classifier is a latitude or longitude.

11. The method of claim 1, wherein the position indicated by the second classifier is provided as coordinates relative to a layout of the indoor area.

12. The method of claim 1, wherein the position indicated by the second classifier is provided graphically on a display.

13. The method of claim 1, further comprising:
    receiving at a mobile device signals from one or more access points;
    determining, using the received signals, the access point island in which the mobile device is located;
    downloading to the mobile device the first classifier;
    executing the first classifier using the received signals;
    downloading to the mobile device the second classifier; and
    executing the second classifier using the received signals.

14. A system for determining a location of a mobile device within an indoor area, comprising:
    a memory storing identifiers of a set of access points associated with an island, where the access points in an island are likely not visible outside that island; and
    a processor configured to:
        build, for each island, a first classifier including one or more decision trees executable using a signal by a mobile device, the output of the one or more decision trees of the first classifier indicating a level of the indoor area; and
        build, for each level, a second classifier including one or more decision trees executable using the signal received by the mobile device, the output of the one or more decision trees of the second classifier indicating a position on the level.

15. The system of claim 14, wherein the island comprises a group of floors in a building.

16. The system of claim 14, wherein the island comprises a building.

17. The system of claim 14, wherein the island comprises a group of buildings.

18. The system of claim 14, wherein the one or more decision trees included in the first and second classifiers comprise:
    starting nodes, the starting nodes presenting first questions related to received signal strengths of access points;
    and intermediate nodes, each intermediate node presenting an additional question related to the received signal strengths of access points.

19. The system of claim 18, wherein the first and additional questions ask whether the received signal strength of one or more particular access points is above or below one or more predetermined values.

20. The system of claim 14, wherein the processor is further configured to:
    build a plurality of first decision trees for inclusion in the first classifier; and average results from the plurality of first decision trees.

21. The system of claim 14, wherein the processor is further configured to:
- build a plurality of second decision trees for inclusion in the second classifier; and
- average results from the plurality of second decision trees.

22. A method for predicting location of a mobile device in an indoor area, comprising:
- receiving signals from one or more access points;
- determining, using the received signals, an access point island in which the mobile device is located;
- downloading a first decision tree corresponding to the access point island, wherein an output of the first decision tree indicates a level of the indoor area; and
- executing the first decision tree using the received signals;
- downloading a second decision tree corresponding to the level of the indoor area, wherein an output of the second decision tree indicates a position on the level; and
- executing the second decision tree using the received signals.

* * * * *